United States Patent

Cotreau et al.

[11] Patent Number: 5,812,658
[45] Date of Patent: Sep. 22, 1998

[54] METHOD AND CIRCUIT FOR FAILSAFE SWITCH-HOOK DETECTION DURING FAULT IN A TELEPHONE SYSTEM

[75] Inventors: Gerald Michael Cotreau, Melbourne; Donald Karl Whitney, Jr., West Melbourne, both of Fla.

[73] Assignee: Harris Corp., Melbourne, Fla.

[21] Appl. No.: 380,413

[22] Filed: Jan. 30, 1995

[51] Int. Cl.[6] .................................................. H04M 1/00
[52] U.S. Cl. .............................. 379/377; 379/26; 379/30; 379/377; 379/380; 379/381
[58] Field of Search ................. 379/26, 30, 377, 379/380, 381, 385, 165, 166, 2, 21, 27, 32, 412

[56] References Cited

U.S. PATENT DOCUMENTS

| | | | |
|---|---|---|---|
| 4,406,929 | 9/1983 | Pace et al. .............................. | 379/402 |
| 4,540,854 | 9/1985 | Beirne ..................................... | 379/377 |
| 4,599,494 | 7/1986 | Welty ...................................... | 379/385 |
| 5,111,497 | 5/1992 | Bliven et al. ............................ | 379/27 |
| 5,404,401 | 4/1995 | Bliven et al. ............................ | 379/442 |

*Primary Examiner*—Krista M. Zele
*Assistant Examiner*—Keith Ferguson
*Attorney, Agent, or Firm*—Rogers & Killeen

[57] ABSTRACT

A circuit and method for maintaining switch-hook detection (SHD) in the presence of a fault in a telephone system may include a comparison of one of a tip current and a ring current to a reference current. A switch-hook detection indicates that a request for service has been made. The reference current may be a conventional switch-hook detection threshold current, $I_{SHD}$, times a factor $(G_0+1)^{-1}$, where $G_0$ is the predetermined operating gain of the amplifier in the telephone subscriber line interface circuit. The line current may be reduced in response to detection of a fault in the telephone system without affecting the determination whether a request for service has being made.

25 Claims, 3 Drawing Sheets

METHOD AND CIRCUIT FOR FAILSAFE SWITCH-HOOK DETECTION DURING FAULT IN A TELEPHONE SYSTEM

BACKGROUND OF THE INVENTION

The present invention relates to switch-hook detection (SHD) and fault detection circuits for telephone systems, and more particularly to a circuit and method for maintaining switch-hook detection in the presence of a fault in a telephone system.

With reference to FIG. 1, a telephone system may include a subscriber telephone 12 connected to a central office through a telephone subscriber line interface circuit (SLIC) 14. The SLIC connects a balanced two wire transmission path (the path to and from the subscriber telephone) with an unbalanced four wire transmission path (the path to and from the distribution circuitry in the telephone central station). SLICs perform various functions, including battery feed, overvoltage protection, ringing, signaling, hybrid, and timing. SLIC operation is known and need not be considered in detail, and only portions of the SLIC 14 that may facilitate an understanding of the background of the present invention are shown in FIG. 1.

Telephone systems operate in potentially harsh environments and the telephone may be miles from the central office where the SLIC is typically located, thereby exposing portions of the system to faults, such as short circuits from accidental grounding, power lines, lightning, etc. The overvoltage function of the SLIC is designed to protect the SLIC from faults. If the SLIC does not detect the short circuit, the SLIC may attempt to drive the short and overheat. When a fault is detected, the SLIC protects itself by limiting or turning off amplifiers 16 in the SLIC that are used to drive the line current to the telephone.

Another function of a SLIC is to supervise telephone operation by detecting when a request for service is made at a telephone. The request for service is made by lifting the handset from the cradle, thereby activating the telephone's hook switch. As indicated in FIG. 1, the request for service is made by closing switch 20. When switch 20 is closed, a dc load is applied between nodes VT and VR. The closing of switch 20 is referred to as a switch-hook and is detected by the SLIC.

Switch-hook detection occurs when the dc current through the telephone line 22 (the line current) exceeds a predetermined magnitude, referred to a threshold current, $I_{SHD}$. As indicated in FIG. 1, the line current comprises the a current $I_T$ that is proportional to the tip voltage plus the amplifier gain G times $I_T$. Typically, a voltage across a resistor $R_{SHD}$ in series with the telephone is measured and compared to reference voltage in a comparator 24, where $R_{SHD}$ and the reference voltage have been selected so that a switch-hook detection is indicated when the line current exceeds $I_{SHD}$. When the measured voltage exceeds the reference voltage, the comparator 24 sends a SHD signal to the SLIC to indicate a request for service. The request for service indication is maintained until the measured voltage no longer exceeds the reference voltage. When the measured voltage no longer exceeds the reference voltage the telephone is disconnected.

Thus, as is apparent, if a fault has been detected and the amplifier 16 is limited or turned off, the line current will be reduced. When the line current is reduced, the SHD measured voltage will no longer exceed the reference voltage and the telephone will be disconnected. The telephone user must redial and attempt to reconnect in order to complete a disconnected call.

When the fault is only transitory, lasting only a few seconds or less, it is desirable to avoid disconnection due to SHD interruption. However, the conflicting, and overriding, need to protect the SLIC by reducing line current has heretofore made it impossible to avoid disconnect due to loss of SHD.

Accordingly, it is an object of the present invention to provide a novel circuit and method for switch-hook detection that obviates the problems of the prior art.

It is another object of the present invention to provide a novel circuit and method for maintaining a SHD indication in the presence of a fault.

It is yet another object of the present invention to provide a novel circuit and method for switch-hook detection in which a tip or ring current is compared to a reference current to determine whether a request for service has been made.

It is still another object of the present invention to provide a novel circuit and method for switch-hook detection in which a copy of one of a tip or ring current is compared to a reference current that is $I_{SHD}$ times a factor that includes $G_0$, the gain of the SLIC amplifier, to determine whether a request for service has been made.

It is a further object of the present invention to provide a novel circuit and method for maintaining a SHD indication in the presence of a fault in which one of a tip and a ring voltage that has been converted to a current is compared to a reference current to determine whether a request for service has been made, and in which a line current is reduced in response to the fault without affecting the SHD comparison.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
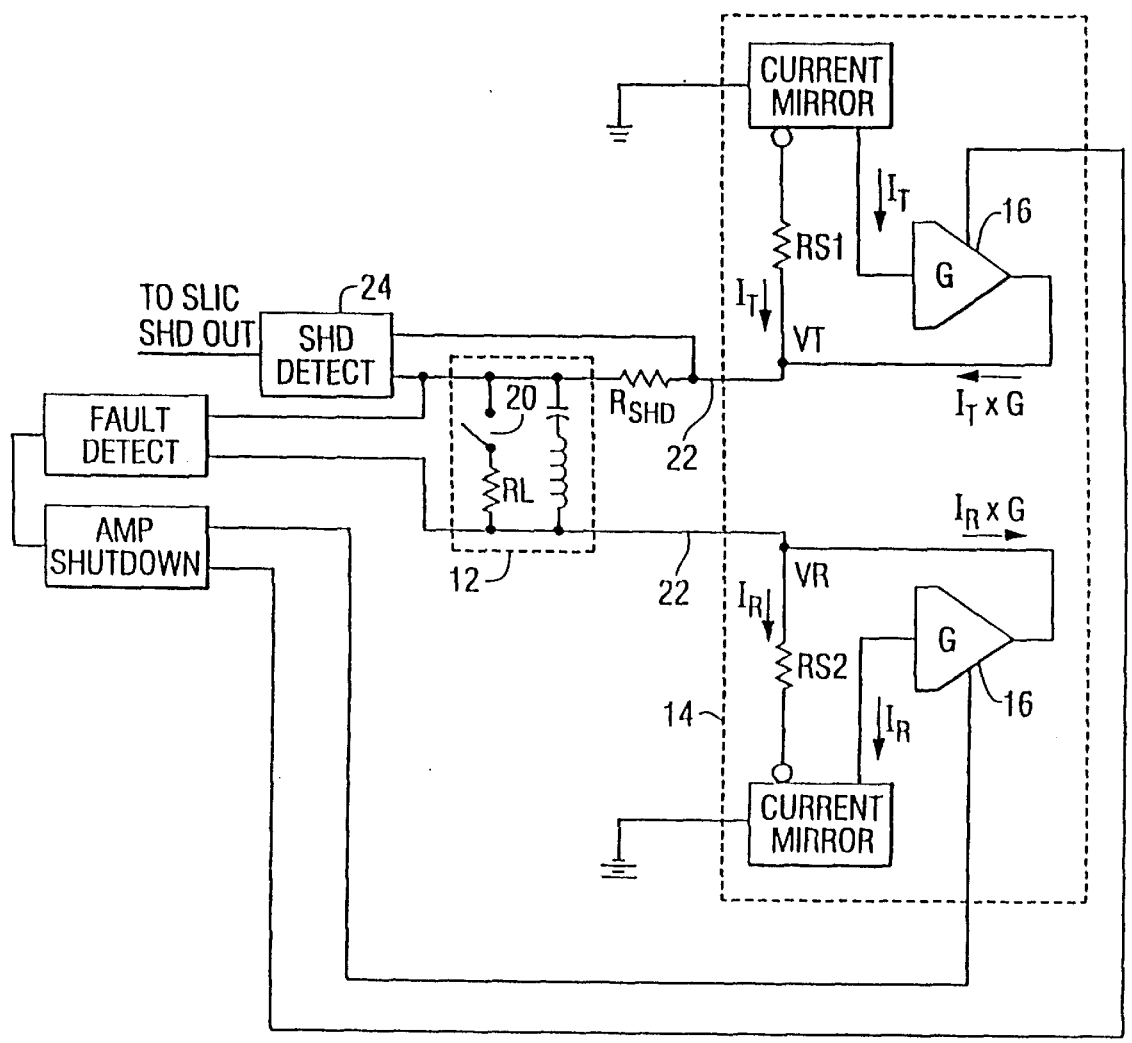
FIG. 1 is schematic diagram of a portion of a prior art telephone system illustrating switch-hook detection and fault detection circuits.
Figure 2:
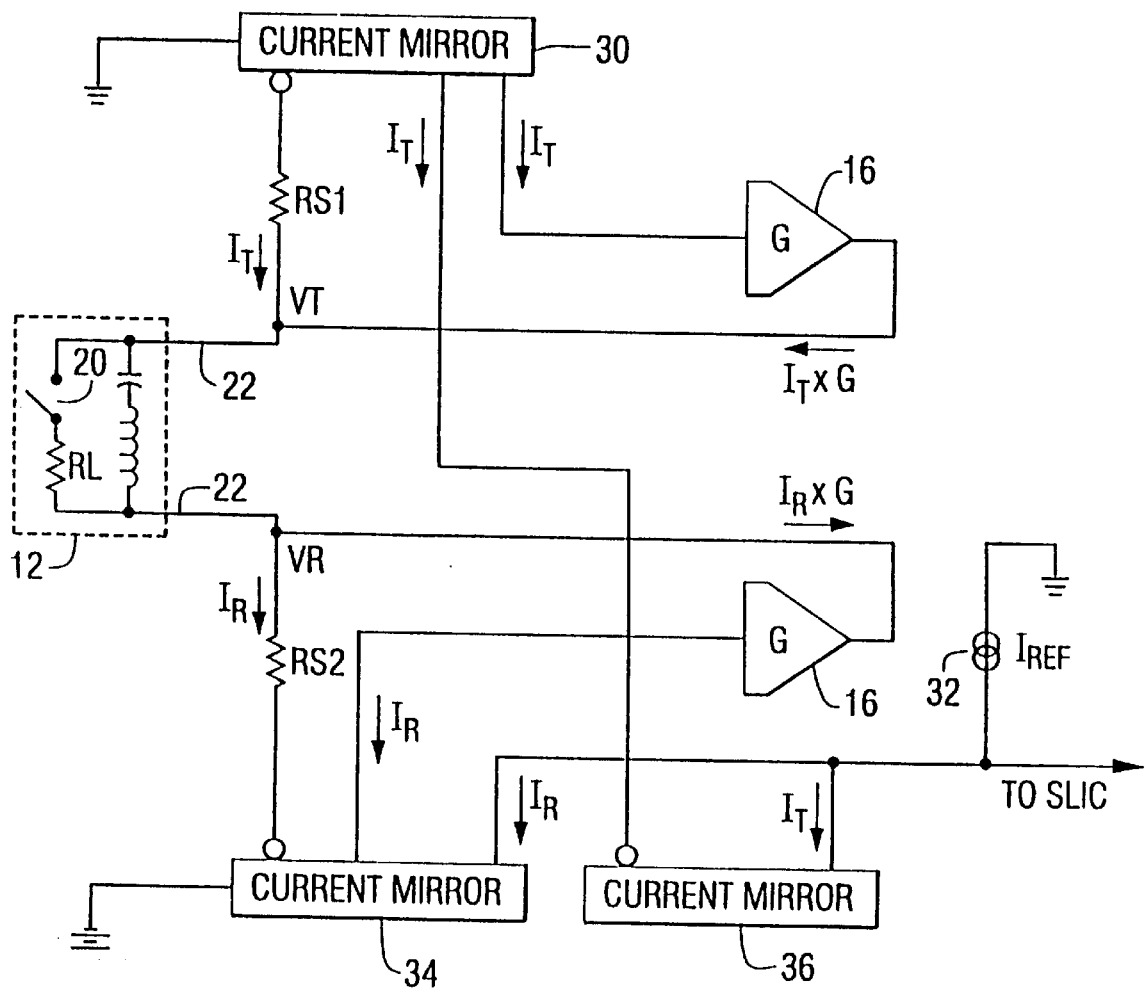
FIG. 2 is schematic diagram of an embodiment of a switch-hook detection circuit of the present invention.
Figure 2A:
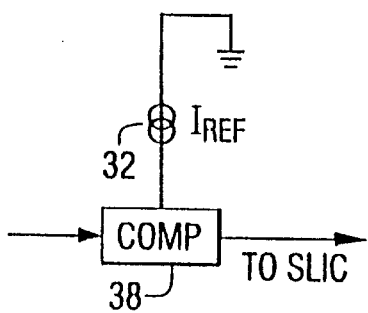
FIG. 2a shows an alternative with a separate current comparator.

With reference now to FIGS. 2–2a, in which like numerical designations for like elements have maintained to facilitate an understanding of the invention, an embodiment of the present invention for indicating switch-hook detection may include a current mirror 30 for providing a copy of $I_T$ for comparison to a reference current, $I_{REF}$, from a current source 32, and in which a switch-hook detection may be indicated when $I_T$ exceeds the reference current. As will be discussed, the SHD indication is not affected by changes in line current.

Instead of using a copy of $I_T$, a copy of $I_R$ from current mirror 34 may be used. In a further alternative, an average of $I_T$ and $I_R$ may be used. Note that the embodiment of FIG. 2 includes current mirrors 30 and 34 and, with appropriate selection of current mirror values, is able to provide an average of the two currents for comparison to the reference current, although this is not required for the present invention. An additional current mirror 36 may be needed to set the polarity of $I_T$ (or $I_R$).

The combination of the copied current and the reference current may be provided to the SLIC to indicate SHD. Alternatively, as shown in FIG. 2a, the copied current and the reference current may be compared in a current comparator 38 that provides a SHD signal to the SLIC.

The reference current from current source 32 may be selected so that a comparison to either $I_T$ or $I_R$ (or their average) can indicate whether a SHD threshold has been exceeded. For example, looking at node VT, the line current, $I_{Line}$, is the sum of $I_T$ and the current from the amplifier 16, $I_T$ times G. That is, $$I_{Line} = I_T \times (G+1) \quad (1)$$

The line current will have exceeded a threshold current, $I_{SHD}$, when, $$I_T > I_{SHD}(G_0+1)^{-1} \quad (2)$$

where $G_0$ is the predetermined operating gain of the amplifier (e.g., 400 in an embodiment of the present invention), and where G is $G_0$ if there is no fault.

A switch-hook may be detected by comparing either $I_T$ or $I_R$ (or their average) to a reference current that is a scaled multiple of $I_{SHD}$. That is, $I_{SHD}$ may be scaled by multiplying times a factor that includes $G_0$. The factor may be $(G_0+1)^{-1}$. Thus, the comparison to a reference to detect a switch-hook is made free of any changes in line current that may result from detection of a fault, or from a problem that affects the output of amplifier 16, such as overheating.

Figure 3:
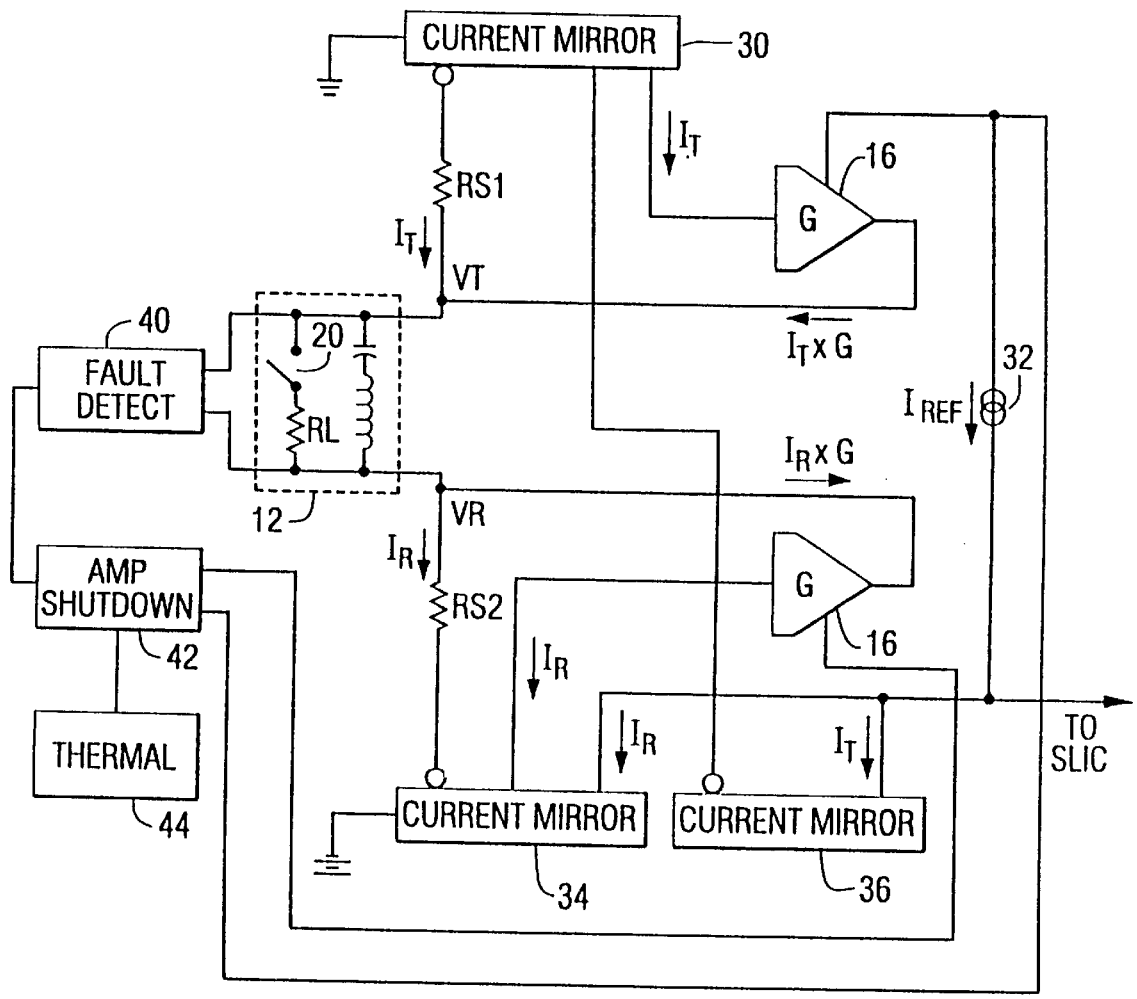
FIG. 3 is schematic diagram of an embodiment of switch-hook detection and fault/thermal detection circuits of the present invention.

With reference now to FIG. 3, a further embodiment of the present invention may include a fault detector 40 and amplifier shut-down circuit 42. In this embodiment, when a fault is detected while the switch 20 is closed (that is, the telephone is connected), SHD is not changed and the telephone remains connected. When a fault is detected and a shut-down signal provided from shut-down circuit 42, the gain G of amplifiers 16 is reduced, thereby leaving the line current across sense resistors RS1 and RS2 and telephone load RL that are in series between battery and ground. RS1 and RS2 are at least an order of magnitude larger than RL so that when the amplifiers are shut down and G is reduced, nodes VT and VR and pulled together and currents $I_T$ and $I_R$ increase so as to continue to exceed the reference current, thereby maintaining a SHD indication. That is, as seen in equation (1), $I_T$ increases as G decreases, and as seen in equation (2), as $I_T$ increases $I_{SHD}$ also increases because $G_0$ is fixed. The SHD indication, in effect, becomes harder. When the fault goes away, the caller may resume conversation without having to redial to reconnect the telephone. The amplifier shut-down circuit 42 may also be responsive to a an overheat in the system (such as an amplifier overheat) that is detected and indicated by a thermal detector 44.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A circuit for indicating switch-hook operation in a telephone system, the telephone system having a telephone connected through a telephone line to a first circuit for carrying a first current, $I_1$, and a first current amplifier with gain G for amplifying $I_1$ by G, and in which a line current in the telephone line is the sum of $I_1$ and $I_1$ times G, and in which switch-hook operation is indicated by the line current exceeding a predetermined switch-hook detection threshold current, $I_{SHD}$, the circuit comprising:

a current source for providing to a comparison circuit a reference current that is $I_{SHD}$ times a factor that includes $G_0$, where $G_0$ is a predetermined operating gain of the current amplifier; and a first current mirror for providing a copy of $I_1$ to said comparison circuit;

whereby switch-hook operation is indicated when said copy of $I_1$ exceeds said reference current.

2. The circuit of claim 1 further comprising a fault detector for providing a signal to reduce an output from the first amplifier, wherein a relationship between said copy of $I_1$ and said reference current is not affected by a change of output from said first amplifier.

3. The circuit of claim 2 wherein said fault detector detects when a short circuit is detected in the telephone line.

4. The circuit of claim 2 wherein said fault detector detects when a temperature of the circuit or the first amplifier exceeds a predetermined value.

5. The circuit of claim 1 wherein said comparison circuit comprises a comparator for indicating when said copy of $I_1$ is greater than said reference current.

6. The circuit of claim 1 wherein said factor includes $(G_0+1)^{-1}$.

7. The circuit of claim 1 wherein the first circuit is a circuit for tip voltage and $I_1$ is a current proportional to tip voltage.

8. The circuit of claim 1 wherein the first circuit is a circuit for ring voltage and $I_1$ is a current proportional to ring voltage.

9. A circuit for switch-hook detection in a telephone system, the telephone system having a telephone connected through a telephone line to a tip circuit for carrying a current, $I_T$ that is proportional to tip voltage and to a ring circuit for carrying a current, $I_R$, that is proportional to a ring voltage, and current amplifiers with gain G for amplifying $I_T$ and $I_R$ by G, and in which a line current in the telephone line is the sum of $I_T$ and $I_T$ times G, and in which switch-hook operation is indicated by the line current exceeding a predetermined switch-hook detection threshold current, $I_{SHD}$, the circuit comprising:

a current source for providing to a detection circuit a reference current that is $I_{SHD}$ times $(G_0+1)^{-1}$, where $G_0$ is a predetermined operating gain of the current amplifier; and a first current mirror for providing a copy of $I_T$ to said detection circuit;

a second current mirror for providing a copy of $I_R$ to said detection circuit;

a comparator in said detection circuit for comparing an average of the copies of $I_R$ and $I_T$ to said reference current;

whereby switch-hook is detected when said average exceeds said reference current.

10. The circuit of claim 9 wherein said comparator provides a switch-hook detection signal when said average exceeds said reference current.

11. The circuit of claim 9 further comprising a fault detector for providing a signal to reduce an output from the amplifiers when a short circuit is detected in the telephone line, wherein a relationship between said average and said reference current is not affected by a change of output from said amplifiers.

12. A circuit for maintaining switch-hook detection in the presence of a short circuit in a telephone system, the telephone system having a telephone connected through a telephone line to a first circuit for carrying a first current, $I_1$, and a first current amplifier with gain G for amplifying $I_1$ by G, and in which a line current in the telephone line is the sum of $I_1$ and $I_1$ times G, and in which switch-hook detection is indicated by the line current exceeding a predetermined switch-hook detection threshold current, $I_{SHD}$, the circuit comprising:

a current source for providing to a comparison circuit a reference current that is $I_{SHD}$ times a factor that includes $G_0$;

a first current mirror for providing a copy of $I_1$ to said comparison circuit; and a fault detector for providing a signal to reduce an output from the first amplifier when a short circuit is detected in the telephone line, a relationship between said copy of $I_1$ and said reference current not being affected by a change of output from said first amplifier.

13. The circuit of claim 12 wherein said factor includes $(G_0+1)^{-1}$.

14. The circuit of claim 12 wherein said comparison circuit comprises a comparator for indicating which one of said copy of $I_1$ and said reference current is greater.

15. The circuit of claim 12 wherein the first circuit is a circuit for a tip voltage and $I_1$ is a current proportional to tip voltage.

16. The circuit of claim 12 wherein the first circuit is a circuit for a ring voltage and $I_1$ is a current proportional to ring voltage.

17. A method of maintaining switch-hook detection in the presence of a fault in a telephone system comprising the steps of comparing one of a tip and a ring current to a reference current to determine whether a request for service is being made, and reducing a line current in the telephone system in response to detection of a fault without affecting the determination whether a request for service is being made.

18. A method of indicating switch-hook operation in a telephone system, the telephone system having a telephone connected through a telephone line to a first circuit for carrying a first current, $I_1$, and a first current amplifier with gain G for amplifying $I_1$ by G, and in which a line current in the telephone line is the sum of $I_1$ and $I_1$ times G, and in which switch-hook operation is indicated by the line current exceeding a predetermined switch-hook detection threshold current, $I_{SHD}$, the method comprising the steps of:

(a) providing to a comparison circuit a reference current that is $I_{SHD}$ times a factor that includes $G_0$; and (b) copying $I_1$ to the comparison circuit;

whereby switch-hook operation is indicated when the copy of $I_1$ exceeds the reference current.

19. The method of claim 18 wherein the factor includes $(G_0+1)^{-1}$.

20. The method of claim 18 further comprising the steps of comparing the copy of $I_1$ and the reference current, and indicating when the copy of $I_1$ is larger than the reference current.

21. The method of claim 18 further comprising the step of providing a signal to reduce an output from the first amplifier when a fault is detected, wherein a relationship between the copy of $I_1$ and the reference current is not affected by a change of output from the first amplifier.

22. The method of claim 21 wherein the fault detected is a short circuit in the telephone line.

23. The method of claim 21 wherein the fault detected is a temperature of the circuit or the first amplifier that exceeds a predetermined value.

24. A method of maintaining switch-hook detection in the presence of a short circuit in a telephone system, the telephone system having a telephone connected through a telephone line to a first circuit for carrying a first current, $I_1$, and a first current amplifier with gain G for amplifying $I_1$ by G, and in which a line current in the telephone line is the sum of $I_1$ and $I_1$ times G, and in which switch-hook detection is indicated by the line current exceeding a predetermined switch-hook detection threshold current, $I_{SHD}$, the method comprising the steps of:

(a) providing to a comparison circuit a reference current that is $I_{SHD}$ times $(G_0+1)^{-1}$;

(b) providing a copy of $I_1$ to the comparison circuit; and (c) providing a signal to reduce an output from the first amplifier when a short circuit is detected in the telephone line, a relationship between said copy of $I_1$ and said reference current not being affected by a change of output from said first amplifier.

25. The method of claim 24 further comprising the steps of comparing the copy of $I_1$ and the reference current, and indicating when the copy of $I_1$ is larger than the reference current.

* * * * *